(12) United States Patent
Yunus et al.

(10) Patent No.: US 11,377,029 B2
(45) Date of Patent: Jul. 5, 2022

(54) VEHICULAR TRAILERING ASSIST SYSTEM WITH TRAILER STATE ESTIMATION

(71) Applicant: Magna Electronics Inc., Auburn Hills, MI (US)

(72) Inventors: Anam M. Yunus, Markham (CA); Mohamad Osseili, Hamilton (CA); Devendra Bajpai, Bloomfield Hills, MI (US); Mohammadmehdi Jalalmaab, Waterloo (CA); Guruprasad Mani Iyer Shankaranarayanan, Mississauga (CA); Jyothi P. Gali, Rochester Hills, MI (US); Galina Okouneva, Markham (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 17/247,220

(22) Filed: Dec. 4, 2020

(65) Prior Publication Data
US 2021/0170947 A1   Jun. 10, 2021

Related U.S. Application Data

(60) Provisional application No. 62/944,477, filed on Dec. 6, 2019.

(51) Int. Cl.
*B60R 1/00* (2022.01)
*G06T 7/70* (2017.01)
(Continued)

(52) U.S. Cl.
CPC ............... *B60R 1/00* (2013.01); *G06T 7/20* (2013.01); *G06T 7/70* (2017.01); *B60R 11/04* (2013.01);
(Continued)

(58) Field of Classification Search
CPC ...... B60R 11/04; B60R 1/00; B60R 2011/004; B60R 2300/30; B60R 2300/808;
(Continued)

(56) References Cited

U.S. PATENT DOCUMENTS 6,690,268 B2   2/2004   Schofield et al.
7,038,577 B2   5/2006   Pawlicki et al.
(Continued)

*Primary Examiner* — Farzana Hossain
(74) *Attorney, Agent, or Firm* — Honigman LLP

(57) ABSTRACT

A vehicular trailer assist system includes a camera disposed at a rear portion of a vehicle, a plurality of sensors, and an electronic control unit (ECU) having a processor for processing image data captured by the camera and sensor data captured by the plurality of sensors. The ECU, responsive to processing of image data captured by the camera, determines a trailer angle of the trailer relative to the vehicle. The ECU, responsive to processing of sensor data captured by the plurality of sensors, predicts a yaw rate of the vehicle and a trailer angle of the trailer relative to the vehicle at a future time. The ECU, responsive to predicting the yaw rate, determines a corrected vehicle yaw rate based on processing of captured image data and captured sensor data, and determines a corrected trailer angle, and determines a vehicle heading and position and a trailer heading and position.

16 Claims, 4 Drawing Sheets

(51) Int. Cl.
 *G06T 7/20* (2017.01)
 *B60R 11/04* (2006.01)
 *B60R 11/00* (2006.01)

(52) U.S. Cl.
 CPC ..... *B60R 2011/004* (2013.01); *B60R 2300/30* (2013.01); *B60R 2300/8086* (2013.01); *G06T 2207/30241* (2013.01); *G06T 2207/30252* (2013.01)

(58) Field of Classification Search
 CPC .. B60R 2300/8086; G06T 2207/30241; G06T 2207/30252; G06T 7/20; G06T 7/70
 See application file for complete search history.

(56) References Cited

U.S. PATENT DOCUMENTS

| | | | |
|---|---|---|---|
| 7,720,580 | B2 | 5/2010 | Higgins-Luthman |
| 7,855,755 | B2 | 12/2010 | Weller et al. |
| 8,694,224 | B2 | 4/2014 | Chundrlik, Jr. et al. |
| 9,085,261 | B2 | 7/2015 | Lu et al. |
| 9,446,713 | B2 | 9/2016 | Lu et al. |
| 9,764,744 | B2 | 9/2017 | Bajpai |
| 10,055,651 | B2 | 8/2018 | Chundrlik, Jr. et al. |
| 10,137,904 | B2 | 11/2018 | Chundrlik, Jr. et al. |
| 10,406,981 | B2 | 9/2019 | Chundrlik, Jr. et al. |
| 2005/0055138 | A1* | 3/2005 | Lee ...................... G05D 1/0891 701/1 |
| 2005/0236894 | A1* | 10/2005 | Lu ........................ B60W 10/20 303/139 |
| 2012/0022780 | A1* | 1/2012 | Kulik .................... G01C 25/00 701/498 |
| 2014/0085472 | A1 | 3/2014 | Lu et al. |
| 2014/0160276 | A1 | 6/2014 | Pliefke et al. |
| 2015/0002670 | A1 | 1/2015 | Bajpai |
| 2015/0217693 | A1 | 8/2015 | Pliefke et al. |
| 2017/0050672 | A1 | 2/2017 | Gieseke et al. |
| 2017/0254873 | A1 | 9/2017 | Koravadi |
| 2018/0111621 | A1* | 4/2018 | Buss .................. B62D 15/027 |
| 2018/0174485 | A1* | 6/2018 | Stankoulov .......... G09B 19/167 |
| 2018/0215382 | A1 | 8/2018 | Gupta et al. |
| 2018/0253608 | A1 | 9/2018 | Diessner et al. |
| 2018/0276838 | A1 | 9/2018 | Gupta et al. |
| 2018/0276839 | A1 | 9/2018 | Diessner et al. |
| 2019/0016264 | A1 | 1/2019 | Potnis et al. |
| 2019/0039649 | A1 | 2/2019 | Gieseke et al. |
| 2019/0042864 | A1 | 2/2019 | Pliefke et al. |
| 2019/0064831 | A1 | 2/2019 | Gali et al. |
| 2019/0092388 | A1* | 3/2019 | Raad .................... B62D 15/024 |
| 2019/0118860 | A1 | 4/2019 | Gali et al. |
| 2019/0143895 | A1 | 5/2019 | Pliefke et al. |
| 2019/0297233 | A1 | 9/2019 | Gali et al. |
| 2019/0347825 | A1 | 11/2019 | Gupta et al. |
| 2020/0017143 | A1 | 1/2020 | Gali |
| 2020/0079165 | A1* | 3/2020 | Niewiadomski ... G06K 9/00791 |
| 2020/0331527 | A1* | 10/2020 | Kim ...................... B62D 13/005 |
| 2020/0334475 | A1 | 10/2020 | Joseph et al. |
| 2020/0356788 | A1 | 11/2020 | Joseph et al. |
| 2020/0406967 | A1* | 12/2020 | Yunus .................... B62D 13/06 |

* cited by examiner

VEHICULAR TRAILERING ASSIST SYSTEM WITH TRAILER STATE ESTIMATION

CROSS REFERENCE TO RELATED APPLICATION

The present application claims the filing benefits of U.S. provisional application Ser. No. 62/944,477, filed Dec. 6, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicular trailer assist systems is common and known. Examples of such known systems are described in U.S. Pat. Nos. 9,446,713 and 9,085,261, which are hereby incorporated herein by reference in their entireties.

SUMMARY OF THE INVENTION

The present invention provides a driver assistance system or trailering assist system for a vehicle that utilizes one or more cameras to capture image data representative of images exterior of the vehicle, and provides a camera disposed at a rear portion of a vehicle and having a field of view exterior of the vehicle, the field of view encompassing at least a portion of a trailer hitched to the vehicle. The system includes a plurality of sensors. The system also includes a control comprising a processor operable to process image data captured by the camera and sensor data captured by the sensors. The image data captured by the camera is representative of the trailer hitched to the vehicle. The control, responsive to processing of sensor data captured by the plurality of sensors, predicts a yaw rate of the vehicle and a trailer angle of the trailer relative to the vehicle at a future time. The control, responsive to predicting the yaw rate, corrects the predicted vehicle yaw rate based on processing of image data captured by the camera and sensor data captured by at least one of the plurality of sensors. The control, responsive to predicting the trailer angle, corrects the predicted trailer angle based on processing of image data captured by the camera and sensor data captured by at least one of the plurality of sensors. Responsive to determining a corrected vehicle yaw rate and a corrected trailer angle, the control determines a vehicle heading and position and a trailer heading and position.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or trailering assist system and/or driving assist system operates to capture images exterior of the vehicle and trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The system includes an image processor or image processing system that is operable to receive image data from one or more cameras and may provide an output to a display device for displaying images representative of the captured image data. Optionally, the system may provide a rearview display or a top down or bird's eye or surround view display or the like.

Figure 1:
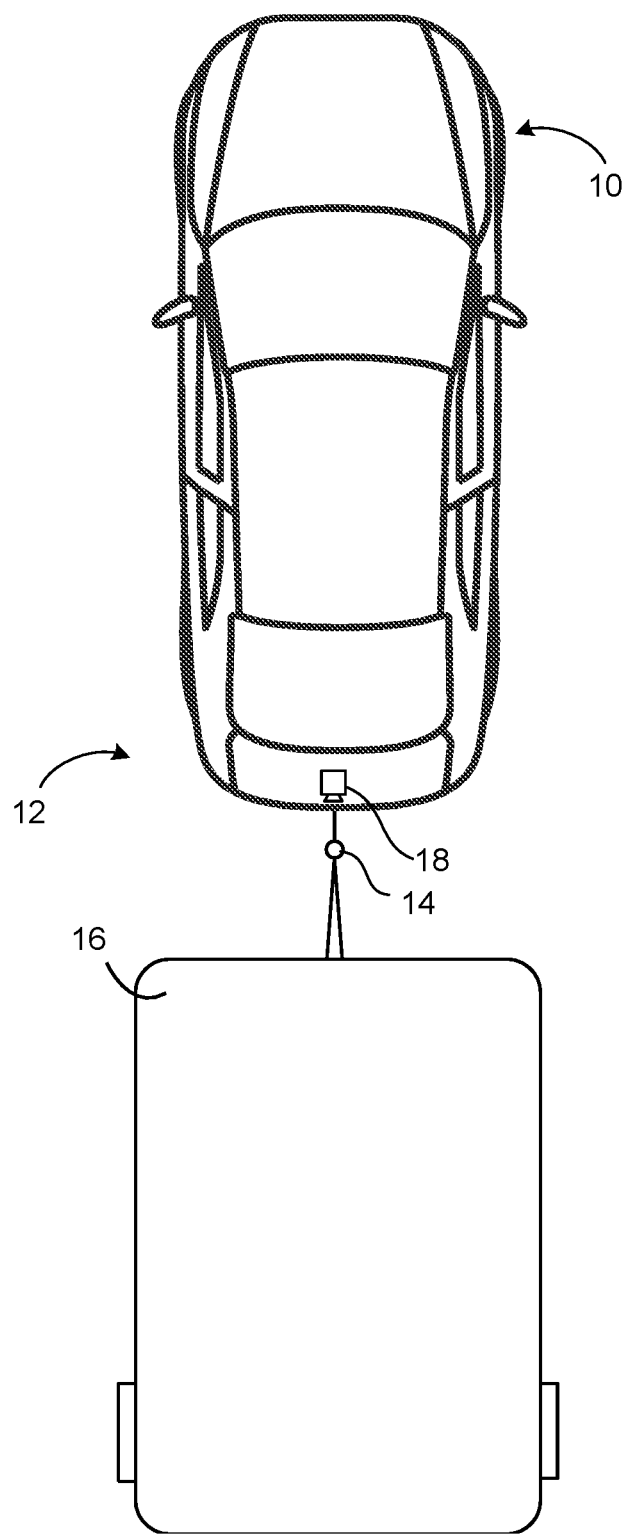
FIG. 1 is a plan view of a vehicle with a trailer assist system that is operable to steer a trailer along a trailer direction in accordance with the present invention.

Referring now to the drawings and the illustrative embodiments depicted therein, a vehicle 10 includes a trailer maneuver assist system 12 that is operable to assist in backing up or reversing with a hitched trailer via, for example, hitch 14 and may maneuver the vehicle 10 and trailer 16 toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior of the vehicle 10, which includes the hitch 14 and/or trailer 16, with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The trailer maneuver assist system 12 includes a control or electronic control unit (ECU) or processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Automated trailering features are becoming increasingly popular. These systems typically require an accurate prediction model for determining the position and heading of the vehicle and trailer to be effective. Higher fidelity vehicle dynamic models are generally difficult to use due to increased computational time and resources and lack of general applicability (i.e., tire parameters, surface conditions, etc.). These higher fidelity vehicle dynamic models are often unnecessary for low speed and for automated trailering applications such as parking and trailer reverse assist. That is, the higher fidelity models consume more computational time and resources than generally necessary for the relatively slow speeds associated with automated trailering applications. Moreover, the difficulty of making kinematic predictions in the low-speed region (such as for low-speed trailering applications) is often compounded by operation in sensor dead zones.

There is significant interest in automated trailering amongst, for example, automobile manufacturers. These features often have strict path deviation and performance requirements. The accuracy of the kinematic predictions of the vehicle-trailer system significantly affects the feature performance. However, in order to reduce costs, these vehicles often have noisy, low-cost sensors with varying degrees of resolution, sensitivity, and accuracy.

Using a single one of these low-cost sensors to estimate a state parameter can often lead to significant errors building up over time due to noise, measurement uncertainty, vehicle-to-vehicle part variation, and/or sensor inaccuracy over time due to vehicle condition degradation. This error accumulation can cause the vehicle-trailer state prediction to drift significantly from the ground truth over time, leading to feature performance degradation. For example, the vehicle and trailer may deviate from intended paths.

Moreover, the accuracy of kinematic predictions are dependent on the array of sensors available in the vehicle and trailer system, which is a function of the vehicle manufacturer, type, and trim level. Different trailering applications require varying drift and stability rates in the kinematic predictions prior to reset. As such, it is advantageous to tune the kinematic predictions using the array of sensors available to provide the required drift rate for the application.

The trailer assist system 12 includes a coupled vehicle-trailer state estimator that uses multiple vehicle sensors together to predict a state of the equipped vehicle and trailer (e.g., a position, a heading, linear velocity, angular velocity, etc.) for low-speed automated trailering features. The system predicts a vehicle and a trailer state based on a kinematic model (e.g., a bicycle or car-like robot model). The system uses the vehicle and trailer states to calculate path deviation in the path planner and subsequent corrections to be made by vehicle control algorithms as part of automated trailering features. The system corrects the prediction using measurements from multiple sensors to improve accuracy of state estimate. Advantageously, the system may automatically tune and adapt to vehicles of varying trim levels containing varying subsets of sensors with differing levels of accuracy, precision, and sensitivity. The system may be tuned with a tuning process using measurement noise covariance matrices that are initialized with direct experimental measurements (when possible or practical), sensor characterization properties, and engineering intuition followed by parameter tuning through numerical optimization to capture unmodeled process and measurement characteristics. The system may also address sensor dead zones encountered in low speed maneuvers.

Optionally, the state estimator is trained online or offline to provide optimal accuracy given the vehicle/trailer sensors in comparison with a traditional high accuracy measurement system. During an evaluation phase, the state estimator measures the feature performance. For example, the system is tuned by connecting a high precision and/or high accuracy measurement system to the vehicle to determine accurate ground truth measurements and using the accurate ground truth measurements to tune the system both offline and online.

The system may perform the prediction and correction of the vehicle and trailer states using various types of nonlinear filters such as an Extended Kalman Filter, an Unscented Kalman Filter, Particle filters, and/or an Error-State Kalman Filter, etc. The sensors that the system may use to correct the vehicle and trailer state estimation may include some or all of the following: a gyroscope, an accelerometer, a steering angle sensor, a pinion angle sensor, one or more wheel revolutions per minute (RPM) sensors, one or more wheel pulse sensors, a magnetometer and/or compass, a global positioning system (GPS) sensor, and one or more imaging sensors (e.g., one or more cameras on the vehicle and/or trailer).

For low speed automated trailering features, the vehicle and trailer velocity and heading are the most critical parameters for the prediction module. Multiple methods of estimating vehicle yaw rate, yaw, and velocity are generated based on the available sensors. Optionally, the system places particular emphasis on sensors available in the vehicle instead of the trailer in order to maintain the general usability of the automated trailering feature for a wide range of trailers without the need for special sensors. That is, by relying on the vehicle sensors when possible, the system becomes more trailer-agnostic. The system chooses the vehicle and trailer motion model for the appropriate dynamics of the target feature. The system chooses the constant velocity and steering angle kinematic model for the vehicle and trailer for the low speed trailering applications.

The system chooses estimation/filtering methods to balance the accuracy prediction with computational cost for the target embedded solution. Available sensors and their noise properties can be characterized using a variety of experimental methodologies. These properties are used to initialize the filter properties. The system may determine regions of applicability of the different sensors by comparison with independent higher accuracy measurement system during the maneuvers of interest as well as expanded range of motion experiments in the training phase. Tuned filter parameters may be varied across these regions of applicability.

Figure 2A:
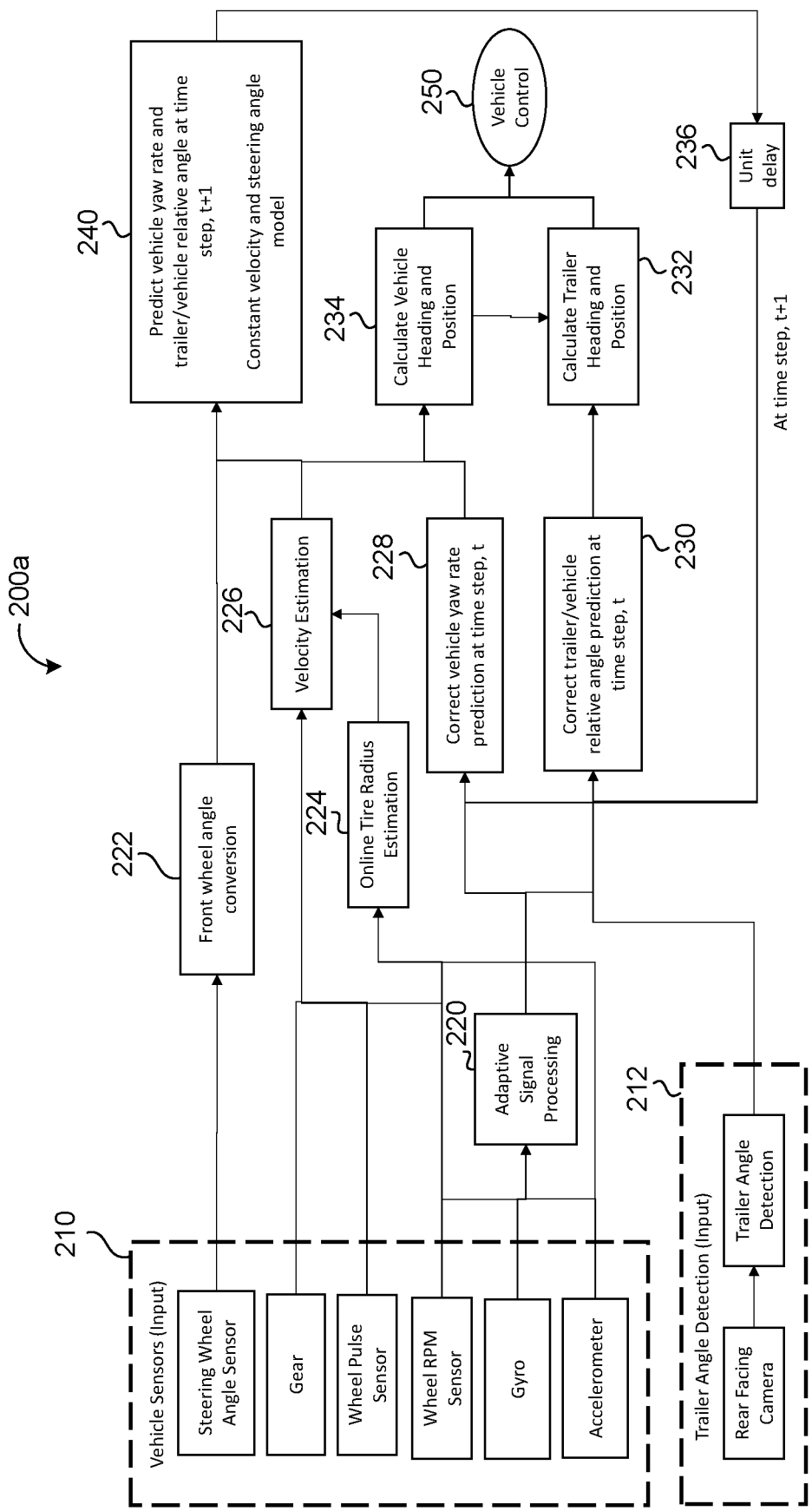
FIGS. 2A, 2B and 3 are schematic views of flowcharts of the trailer assist system of FIG. 1.
Figure 2B:
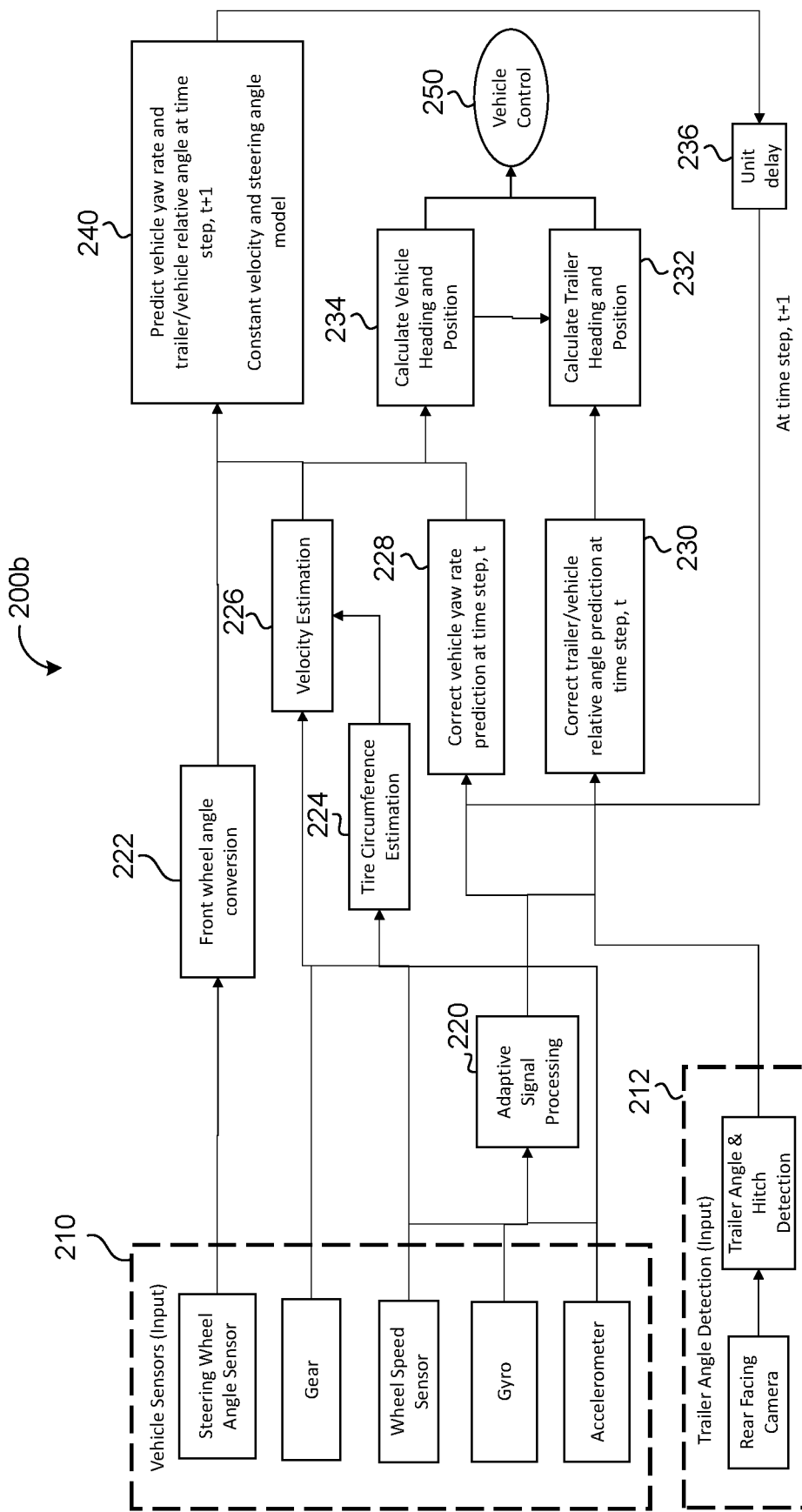
Figure 3:
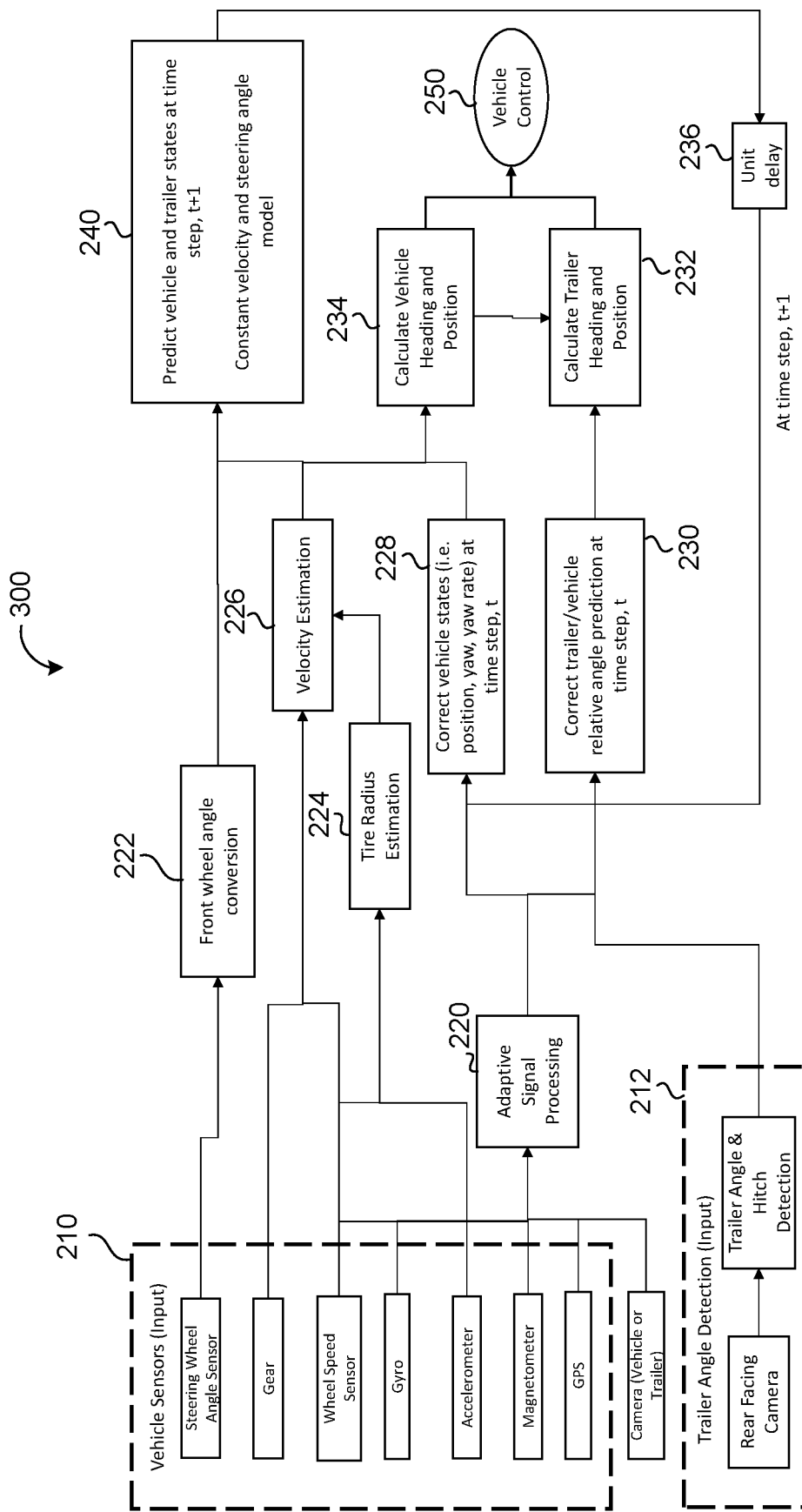

Referring now to FIGS. 2A-3, a block diagram 200a (FIG. 2A) and a block diagram 200b (FIG. 2B) of the trailer assist system each illustrate an algorithm flowchart for a sample subset of sensors for short duration trailer maneuvers while another block diagram 300 (FIG. 3) of the trailer assist system illustrates an algorithm flowchart for a sample subset of sensors for long duration trailering maneuvers. For example, the system may include a number of vehicle sensors 210 for input. These sensors may include a steering wheel angle sensor, one or more wheel speed sensors (e.g., a wheel RPM sensor, a wheel pulse sensor, etc.), a gyroscope, and an accelerometer. The system may also receive the current gear the vehicle is in (e.g., drive, reverse, neutral, etc.) from a sensor. The system may also receive trailer angle detection inputs 212 from, for example, a trailer angle detection module that determines the trailer angle (i.e., the angle of the trailer relative to a longitudinal axis of the vehicle) from images captured by a rear facing camera. Several equations may be applicable for determining vehicle-trailer kinematics for low speed trailering applications. The following equations are examples.

$$V = \tfrac{1}{2}(RPM_{rf} + RPM_{rr})L_{whlcirc}$$

$$\dot{x} = V\cos\theta$$

$$\dot{y} = V\sin\theta$$

$$\dot{\phi} = -V/L_{beam}\sin(\phi) - \dot{\theta}(1_{L_{beam}}{}^{L_{hitch}}\cos(\phi))$$

$$\theta_T = \theta + \phi$$

$$x_T = x - (L_{hitch}\cos\theta + L_{beam}\cos\theta_T)$$

$$y_T = y - (L_{hitch}\sin\theta + L_{beam}\sin\theta_T)$$

In these equations, $\phi$ is the relative vehicle-trailer angle in degrees. The variable $\dot\phi$, represents relative vehicle-trailer angular velocity in degrees per second. The variable V represents vehicle speed in meters per second from wheel odometry. The variables (x, y) and $(x_T, y_T)$ represent vehicle and trailer positions in meters. The variables $\theta$ and $\theta_T$ represent vehicle and trailer heading in degrees (i.e., between negative 180 degrees and positive 180 degrees). The variable $L_{hitch}$ represents distance from vehicle rear axle to hitch point in meters. The variable $L_{beam}$ represents the trailer beam length in meters. The variables $RPM_{rl}$ $RPM_{rr}$ represent rear left and rear riqht wheel RPMs respectively (i.e., in rotations per second). The variable $L_{whlcirc}$ represents effective wheel circumference in meters. The system 12 may use some or all of these equations to predict and calculate the vehicle and/or trailer position, heading, yaw rate, etc.

As shown in FIG. 2, a front wheel angle conversion module 222 may receive sensor data from the steering wheel angle sensor to determine an angle of the front wheels of the vehicle relative to the vehicle. A velocity estimation module 226 may receive sensor data from the wheel pulse sensor, the wheel RPM sensor, a gear sensor or setting that indicates the gear that the vehicle transmission is in, such as via a transmission gear sensor (such as for internal combustion engine vehicle) or such as via a forward/reverse position sensor or indication (such as for an electric vehicle), and/or an online tire radius estimation from an online tire radius estimation module 224. In the context of the present application, a transmission or propulsion position sensor comprises (a) selection of a forward or rearward propulsion gear in a vehicle being propelled by an internal combustion engine or (b) selection of a forward or rearward propulsion in an electric vehicle. The online tire radius estimation module 224 may estimate or determine the tire radius of the vehicle based on sensor data from the wheel RPM sensor and the accelerometer. The velocity estimation module 226 may use these inputs to estimate a current velocity of the vehicle.

Optionally, the system estimates a tire circumference using a calibration procedure prior to the trailering maneuver. For example, when the user has changed vehicle tires, they may be required to perform a calibration driving maneuver such as driving in a circle with a fixed steering wheel angle. The system may implement optical flow techniques using available vehicle cameras can be to estimate velocity and yaw rate of the vehicle. The characteristic tire circumference, $L_{circ}$, can be estimated using this velocity and yaw rate combined with wheel speed sensor inputs.

The advantage of using this calibration method is to capture dynamic loaded tire characteristics for the particular tire being used, resulting in improved velocity estimation during the trailering maneuvers. Using unloaded tire circumference values in state estimation can results in error accumulation in position and heading due to velocity overestimation.

This technique is universally applicable to vehicles as even the lowest trim-level modern vehicle is typically required to have a rear vehicle camera (e.g., to detect trailer angle). As such, this technique may be applied prior to attaching the trailer using the rear vehicle camera on any vehicle used for automated trailering applications.

Alternatively, a lookup table (LUT) with characteristic tire circumferences for the range of expected tires may be composed as a function of tire pressure (commonly available on CAN buses) and tire sizing labels. The user may select what tire size they have installed on the vehicle prior to initiating trailering feature. Tire circumference can be refined online using the accelerometer (when available) and wheel odometry.

Using the front wheel angle conversion, the vehicle velocity estimation, a yaw prediction module 240 may predict the yaw rate of the vehicle and the relative angle between the trailer and the vehicle (i.e., the trailer angle) at time step t+1. That is, the yaw prediction module 240, at time t, predicts the vehicle yaw rate and trailer angle at the next time step (i.e., t+1 or one time step in the future, such as 1 millisecond, 100 milliseconds, 1 second, 3 seconds in the future, etc.). The yaw prediction module 240 may use a constant velocity and steering angle model to predict the yaw rate and trailer angle.

Vehicle yaw rate can be calculated using any subset of the sensors 210 and filtered to estimate the true vehicle yaw rate. For a steering wheel angle sensor using the bicycle kinematic mode, the yaw rate may be determined from the following equation:

$$\dot\theta_B = \frac{V}{L_{wb}}\tan(\delta) \qquad (1)$$

Here, V is the vehicle speed (in m/s), $L_{wb}$ is the vehicle wheelbase (in meters), $\delta$ is the vehicle front wheel angle (in degrees). The front wheel angle may be obtains from a look up table that maps $\delta$ to steering wheel angle (SWA). The look up table may be stored at the vehicle in, for example, nonvolatile memory.

For a gyroscope, the yaw rate may be determined from the equation:

$$\dot\theta_G = \dot\theta_{G,raw} - \dot\theta_{G,bias} \qquad (2)$$

Here, $\dot\theta_{G,\,raw}$ is the raw gyro measurement while $\dot\theta_{G,\,bias}$ is the gyro zero bias, For differential wheel speed sensors (i.e. wheel RPM sensors), the yaw rate may be determined from the equation:

$$\dot\theta_{ws} = \frac{V_{RR} - V_{RL}}{L_{tw}} - \dot\theta_{ws,bias} \qquad (3)$$

Here, $V_{RL}$ and $V_{RR}$ are the rear right and left wheel speeds (in m/s) and $L_{tw}$ is the track width in meters. The variable $\dot\theta_{ws,\,bias}$ is the zero bias in the yaw rate calculated from wheel speeds.

For an accelerometer, the yaw rate may be determined from the equation:

$$\dot\theta_a = \frac{(a_{lat,raw} - a_{lat,bias})}{V} \qquad (4)$$

Here, V is the vehicle speed (in m/s) while $a_{lat,\,raw}$ is the raw lateral acceleration measurement and $a_{lat,\,bias}$ is the lateral acceleration zero bias.

For low speed trailering maneuvers of short duration (e.g., parking), signal biases from previous maneuvers stored in memory may be used to initialize the bias estimator and refined with online estimation/filtering during the applicable vehicle state. For example, gyroscope biases may be refined when the vehicle is moving straight (i.e., the steering wheel angle is at or close to zero) or the vehicle velocity is at or close to zero.

At low speeds, wheel speed sensors usually have sensor dead zones at different speed cut-offs. However, estimating the velocity using only the accelerometer signals in the low speed state may result in a drifting velocity calculation due to integration of noise inherent in the signal even after signal processing. The accuracy of using the raw wheel pulse signal to estimate the vehicle state results in heading and position error accumulation that is a function of the resolution of the wheel encoder and tire radius.

For low speed applications, the error accumulation during this sensor dead zone can have significant impact on the final feature performance. In order to overcome this limitation, the system may perform motion detection using camera images and the raw wheel pulse signal to estimate velocity during this dead zone. The system may employ traditional and/or deep learning based optical flow techniques using camera images as an additional continuous velocity estimation method to improve accuracy. These methods may be too computationally intensive for use at higher speeds depending on the target hardware, but may well be suited for velocity/yaw rate estimation for low speeds in the sensor dead zones. The state estimations generated by the system may be based on ground features using a ground facing rear camera and may yield sufficient results and the system may implement similar techniques front, rear, and/or side cameras.

In some examples, the system performs vehicle motion detection using images from front, rear, side and/or ground facing cameras for ground features of interest. Once motion is detected, the system may start a counter $t=t_0$. Then, the system updates the vehicle and trailer position and orientation when the change in the wheel pulse signal is nonzero.

Optionally, the system integrates the bicycle kinematic equation (i.e., Equation (1)) over a time interval between each nonzero wheel pulse signal change ($\Delta t$). For example, the system may use the following equation:

$$\int_t^{t+\Delta t} \dot{\theta}_B dt = \frac{V}{L_{wb}} \int_t^{t+\Delta t} \tan(\delta) dt \quad (5)$$

Equation (5) assumes constant V over $\Delta t$. Then, the system may use the following equation:

$$\Delta \theta_B = \frac{\Delta s}{L_{wb}} \left(\frac{1}{\Delta t}\right) \int_t^{t+\Delta t} \tan(\delta) dt = \frac{\Delta s}{L_{wb}} \overline{(\tan \delta)} \quad (6)$$

where $\Delta s$ is the distance travelled over $\Delta t$ and $\overline{\tan \delta}$ is the running average of $\tan \delta$ over $\Delta t$ that is reset upon state update. To solve for $\Delta s$, the system may use the equation:

$$\Delta s = (\Delta WP) \left(\frac{L_{whlcirc}}{WP_{range}}\right) \quad (7)$$

Here, $\Delta WP$ is the change in the wheel pulse signal [0, $W_{range}$] and $WP_{range}$ is the range of the wheel pulse signal (i.e. $WP_{max} - WP_{min} + 1$).

The vehicle yaw rate prediction is passed to a vehicle yaw rate correction module 228, which uses the prediction along with inputs from the gyroscope and trailer angle detection sensors 212 to correct the vehicle yaw rate. The vehicle yaw rate prediction may first pass through a unit delay 236, such that the vehicle yaw rate correction module 228 may compare the prediction to the actual vehicle yaw rate. That is, the vehicle yaw rate correction module 228 may determine an accuracy of the predicted vehicle yaw rate. Based on a difference between the prediction and the actual vehicle yaw rate, the vehicle yaw rate prediction module 228 passes a correction to the yaw prediction module 240.

Similarly, the trailer angle prediction is passed to a trailer angle correction module 230, which also may use the prediction along with inputs from the gyroscope and trailer angle detection sensors 212 to correct the trailer angle prediction. Like the vehicle yaw rate prediction, the trailer angle prediction may first pass through a unit delay 236, such that the trailer angle correction module 230 may compare the prediction to the actual trailer angle. Based on a difference between the prediction and the actual trailer angle, the trailer angle rate prediction module 230 passes a correction to the yaw prediction module 240. In some examples, the gyroscope sensor data first passes through an adaptive signal processing module 220.

The adaptive signal processing module 220 may preprocess sensor signals that require preprocessing prior to usage in the state estimator with operations such as denoising, bias removal, and prewhitening. Dependent on resolution and sensitivity, different sensors measurements may be used as for state estimate corrections in filters or as a state reset/reinitialization value. Signal processing operations applied are dependent on the regions of operation for the various sensors and their resolutions and sensitivities. For example, the low compass resolution and low accuracy GPS course over ground commonly found in vehicle infotainment systems may be used to reset/check the estimated vehicle heading that are prone to drift due to integration of noisy gyroscope signals. The system may determine regions of operation of different low cost sensors by comparison of corrected state estimation with subsets of filter parameters against ground truth measurements from a separate high accuracy measurement system during the training phase.

Optionally, the system performs online filter auto-tuning (e.g., training). Manual tuning of filter parameters involves exploration of all degrees of freedom until the required accuracy and/or estimation drift rate for the application is achieved. This may be a time consuming and/or difficult process as the interactions and sensitivities of different filter parameters must be studied. Moreover, the problem results in a large search space even for simple trailering maneuvers and after a reduction in number of state parameters estimated for vehicles of lower trim levels. However, the system may auto-tune filters by reformulation as an optimization problem to minimize mean squared error. The system may train filters both using offline CAN simulation of logs from the maneuvers and online adaptive tuning while driving. Online tuning may be advantageous to capture real time asynchronous CAN behavior and discretization errors in the auto-tuning process. The system may be tuned on different surfaces and physical locations in order to ensure generalizability.

Optionally, the system estimates measurement noise covariance. For example, the system assumes the measurement noise of the different sensors and measured states are independent and time-invariant. That is, the measurement noise covariance matrix is diagonal and constant. For low speed trailering maneuvers such as trailer reverse assist and trailer autopark, time variation and off diagonal terms are not significant because these maneuvers are of short duration.

The system may estimate the measurement noise covariance through direct experimental measurement. For example, an inertial measurement unit (IMU) noise may be characterizes using Allan Variance. A quantify of error/noise characteristics may be compared against a high precision and accurate reference sensor.

Additionally or alternatively, the system may estimate the measurement noise covariance through engineering intuition based on the sensor characterization datasheet. For example, when $R_1$ and $R_2$ represent the measurement noise covariance matrices for different sensors, the ratio of the elements of $R_i$ measuring the same states may have a similar order of magnitude as the ratio of the sensor resolutions.

Optionally, the system parameterizes the process noise covariance matrix with a simple constant diagonal parameterization (i.e. $Q=\lambda I$), which is sufficient for many low speed applications. When accuracy of tuned predictor is insufficient, the system may employ a more complex parameterization with off-diagonal terms. Use adaptive filtering techniques (i.e. adaptive Kalman Filter variants) or meta-heuristic search methods, the system may estimate near-optimal process noise covariance parameters. The system may use an adaptive tabu search with constraints based on engineering intuition, sensitivity to parameter variations, and/or external disturbance modeling to narrow search space.

Optionally, the system uses a high precision and accuracy measurement systems such as a RTK GNSS/INS measurement system to get the ground truth of vehicle/trailer states during the maneuvers of interest for various surfaces, inclinations, and surface conditions (e.g., roughness, friction, etc.). The predictor may be trained online by repeated trailering maneuvers as well as additional variations in order to cover larger range of motion. Given a fixed measurement noise covariance matrix, the system may minimize mean squared estimation error of the filter of interest with respect to these high precision measurements for the maneuver duration:

$$\varepsilon = \frac{\sum_k^n \varepsilon_k}{n} = \frac{\sum_k^n (x_{h,gt} - x_k^+)^2}{n} \qquad (8)$$

In Equation (8), n is the number of measurement samples, $x_{k,gt}$ are the ground truth values from the high accuracy measurement system, and $x_k^+$ are the state estimations from the chosen filter. This value ($\varepsilon$) may be further normalized with respect to time or distance travelled in order to target a maximum state estimation drift rate that is required for the trailering application given the sensor array available and back calculated from the feature performance requirements.

In some examples, the system includes a trailer heading calculating module 232 and a vehicle heading calculating module 234. These modules receive the corrected vehicle yaw rates and trailer angles and calculate the vehicle heading and position and the trailer heading and position respectively. The vehicle heading and position and the trailer heading and position is passed to vehicle control 250.

Automated trailering feature performance is heavily affected by the accuracy of position and heading predictions. The trailer assist system uses multiple sensors to estimate the most probable position and heading of the vehicle and trailer in order to limit drift and improve the efficacy of vehicle control strategies used in automated trailering features. These more accurate kinematic predictions lead to improved feature performance which results in a significant competitive advantage over previous systems and methods.

The system may utilize aspects of the trailering assist systems or trailer angle detection systems or trailer hitch assist systems described in U.S. Pat. No. 6,690,268, and/or U.S. Publication Nos. US-2020-0356788; US-2020-0334475; US-2020-0017143; US-2019-0347825; US-2019-0297233; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0050672; US-2015-0217693; US-2014-0160276; US-2014-0085472 and/or US-2015-0002670, and/or U.S. patent application Ser. No. 16/946,542, filed on Jun. 26, 2020, and published on Dec. 31, 2020 as U.S. Patent Publication No. US-2020-0406967, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer assist system, the vehicular trailer assist system comprising:
a camera disposed at a rear portion of a vehicle and viewing at least a portion of a trailer hitched to the vehicle;
a plurality of sensors disposed at the vehicle, wherein the plurality of sensors comprises at least two selected from the group consisting of (i) a steering wheel angle sensor, (ii) a wheel speed sensor, (iii) a gyroscope, (iv) an accelerometer, (v) a transmission position sensor;
an electronic control unit (ECU) comprising electronic circuitry and associated software;
wherein the electronic circuitry of the ECU comprises a processor for processing image data captured by the camera and sensor data captured by the plurality of sensors;
wherein, as the vehicle and trailer travel along a road, the ECU, responsive to processing of image data captured by the camera, determines trailer angle of the trailer relative to the vehicle that the trailer is hitched to;
wherein the ECU, responsive to processing of sensor data captured by the plurality of sensors, determines a tire radius estimation;
wherein, as the vehicle and trailer travel along the road, the ECU, responsive to processing of sensor data captured by the plurality of sensors and responsive to determining the tire radius estimation, determines (i) a predicted vehicle yaw rate of the vehicle and (ii) a predicted trailer angle of the trailer relative to a longitudinal axis of the vehicle;
wherein, as the vehicle and trailer travel along the road, the ECU determines the predicted vehicle yaw rate and the predicted trailer angle based on a constant velocity and steering angle model;
wherein, as the vehicle and trailer travel along the road, the ECU, responsive to determining the predicted vehicle yaw rate, determines a corrected vehicle yaw rate based on processing of image data captured by the camera and based on sensor data captured by at least one of the plurality of sensors; and
wherein, as the vehicle and trailer travel along the road, the ECU, responsive to determining the predicted trailer angle, determines a corrected trailer angle based on processing of image data captured by the camera and based on sensor data captured by at least one of the plurality of sensors.

2. The vehicular trailer assist system of claim 1, wherein the plurality of sensors comprises at least one steering wheel angle sensor, at least one wheel speed sensor, at least one gyroscope, and at least one accelerometer.

3. The vehicular trailer assist system of claim 1, wherein the plurality of sensors comprise a transmission position sensor.

4. The vehicular trailer assist system of claim 1, wherein the determined tire radius estimation is based on sensor data from a wheel speed sensor and an accelerometer.

5. The vehicular trailer assist system of claim 1, wherein, as the vehicle and trailer travel along the road, the ECU, responsive to processing of sensor data captured by the plurality of sensors, estimates a velocity of the vehicle.

6. The vehicular trailer assist system of claim 5, wherein the estimated velocity is based on sensor data from a wheel pulse sensor and a wheel revolutions per minute (RPM) sensor.

7. The vehicular trailer assist system of claim 6, wherein the estimated velocity is further based on image data captured by the camera.

8. The vehicular trailer assist system of claim 1, wherein the ECU performs adaptive signal processing on at least a portion of the sensor data captured from the plurality of sensors.

9. The vehicular trailer assist system of claim 1, wherein, as the vehicle and trailer travel along the road, the ECU, responsive to processing of sensor data captured by a steering wheel angle sensor, determines a current front wheel angle conversion of the vehicle.

10. The vehicular trailer assist system of claim 1, wherein, responsive to determining the corrected vehicle yaw rate and the corrected trailer angle, the ECU determines a vehicle trajectory and a trailer trajectory as the vehicle and trailer travel along the road.

11. The vehicular trailer assist system of claim 1, wherein the ECU determines the tire radius estimation based on a previously performed calibration procedure.

12. The vehicular trailer assist system of claim 1, wherein the ECU determines the tire radius estimation based on a user selection.

13. A vehicular trailer assist system, the vehicular trailer assist system comprising:
    a camera disposed at a rear portion of a vehicle and viewing at least a portion of a trailer hitched to the vehicle;
    a plurality of sensors disposed at the vehicle, wherein the plurality of sensors comprises at least two selected from the group consisting of (i) a steering wheel angle sensor, (ii) a wheel speed sensor, (iii) a gyroscope, (iv) an accelerometer, (v) a transmission position sensor;
    an electronic control unit (ECU) comprising electronic circuitry and associated software;
    wherein the electronic circuitry of the ECU comprises a processor for processing image data captured by the camera and sensor data captured by the plurality of sensors;
    wherein, as the vehicle and trailer travel along a road, the ECU, responsive to processing of image data captured by the camera, determines trailer angle of the trailer relative to the vehicle that the trailer is hitched to;
    wherein, as the vehicle and trailer travel along the road, the ECU, responsive to processing of sensor data captured by the plurality of sensors, estimates a velocity of the vehicle;
    wherein the ECU, responsive to processing of sensor data captured by the plurality of sensors, determines a tire radius estimation;
    wherein, as the vehicle and trailer travel along the road, the ECU, responsive to processing of sensor data captured by the plurality of sensors and based on the estimated velocity of the vehicle and responsive to determining the tire radius estimation, determines (i) a predicted vehicle yaw rate of the vehicle and (ii) a predicted trailer angle of the trailer relative to a longitudinal axis of the vehicle;
    wherein, as the vehicle and trailer travel along the road, the ECU determines the predicted vehicle yaw rate and the predicted trailer angle based on a constant velocity and steering angle model;
    wherein, as the vehicle and trailer travel along the road, the ECU, responsive to determining the predicted vehicle yaw rate, determines a corrected vehicle yaw rate based on processing of image data captured by the camera and based on sensor data captured by at least one of the plurality of sensors;
    wherein, as the vehicle and trailer travel along the road, the ECU, responsive to determining the predicted trailer angle, determines a corrected trailer angle based on processing of image data captured by the camera and based on sensor data captured by at least one of the plurality of sensors; and
    wherein, responsive to determining the corrected vehicle yaw rate and the corrected trailer angle, the ECU determines a vehicle trajectory and a trailer trajectory as the vehicle and trailer travel along the road.

14. The vehicular trailer assist system of claim 13, wherein the plurality of sensors comprises at least one steering wheel angle sensor, at least one wheel speed sensor, at least one gyroscope, and at least on accelerometer.

15. The vehicular trailer assist system of claim 13, wherein the ECU determines the tire radius estimated based on a previously performed calibration procedure.

16. The vehicular trailer assist system of claim 13, wherein the ECU determines the tire radius estimation based on a user selection.

* * * * *

UNITED STATES PATENT AND TRADEMARK OFFICE
CERTIFICATE OF CORRECTION

PATENT NO. : 11,377,029 B2
APPLICATION NO. : 17/247220
DATED : July 5, 2022
INVENTOR(S) : Yunus et al.

Page 1 of 1

It is certified that error appears in the above-identified patent and that said Letters Patent is hereby corrected as shown below:

In the Specification

Column 4

Lines 65-68, " $\dot{\phi} = -V/L_{beam} \sin(\phi) - \dot{\theta}(1_{L_{beam}}{}^{L_{hitch}} \cos(\phi))$  $\theta_T = \theta + \phi$ " should be $$\dot{\phi} = -\frac{V}{L_{beam}}\sin(\phi) - \dot{\theta}(1 + \frac{L_{hitch}}{L_{beam}}\cos(\phi))$$

$$\theta_T = x - (L_{hitch}\cos\theta + L_{beam}\cos\theta_T)$$

--                                                                                    --

Column 5
Line 15, "riqht" should be --right--

Signed and Sealed this
Ninth Day of August, 2022

Katherine Kelly Vidal
*Director of the United States Patent and Trademark Office*